United States Patent
Park et al.

(10) Patent No.: US 9,284,425 B2
(45) Date of Patent: Mar. 15, 2016

(54) DIMENSIONALLY STABLE RESIN COMPOSITION FOR FLOORING

(71) Applicants: LG Hausys, Ltd., Seoul (KR); Sang Joon Park, Busan (KR)

(72) Inventors: Sang Joon Park, Busan (KR); Sung Ha Park, Cheongju-si (KR); Jae Wan Sung, Ulsan (KR); Jung Seop Lim, Gunpo-si (KR)

(73) Assignees: LG Hausys, Ltd., Seoul (KR); Sang Joon Park, Busan (KR)

( * ) Notice: Subject to any disclaimer, the term of this patent is extended or adjusted under 35 U.S.C. 154(b) by 0 days.

(21) Appl. No.: 14/378,465

(22) PCT Filed: Dec. 27, 2012

(86) PCT No.: PCT/KR2012/011522
§ 371 (c)(1),
(2) Date: Aug. 13, 2014

(87) PCT Pub. No.: WO2013/133520
PCT Pub. Date: Sep. 12, 2013

(65) Prior Publication Data
US 2015/0025183 A1   Jan. 22, 2015

(30) Foreign Application Priority Data
Mar. 8, 2012  (KR) .................. 10-2012-0023963

(51) Int. Cl.
| C08J 5/18 | (2006.01) |
| C08L 67/04 | (2006.01) |
| B29C 43/24 | (2006.01) |
| E04F 15/12 | (2006.01) |
| B29K 67/00 | (2006.01) |
| B29L 31/00 | (2006.01) |
| E04F 15/10 | (2006.01) |

(52) U.S. Cl.
CPC . *C08J 5/18* (2013.01); *B29C 43/24* (2013.01); *C08L 67/04* (2013.01); *B29K 2067/046* (2013.01); *B29L 2031/732* (2013.01); *C08J 2367/04* (2013.01); *C08J 2433/08* (2013.01); *E04F 15/105* (2013.01); *E04F 15/12* (2013.01)

(58) Field of Classification Search
CPC ............ C08J 5/18; C08L 67/04; C08L 33/08; C08K 5/11; B29C 43/24
USPC .......................................... 524/186
See application file for complete search history.

(56) References Cited

U.S. PATENT DOCUMENTS

| 2002/0128384 A1 | 9/2002 | Wang et al. | |
| 2011/0065573 A1* | 3/2011 | McEneany et al. | 502/402 |
| 2011/0178196 A1* | 7/2011 | Steinke et al. | 521/135 |
| 2012/0211927 A1* | 8/2012 | Li et al. | 264/523 |

FOREIGN PATENT DOCUMENTS

| JP | 2010180315 A | 8/2010 |
| JP | 2011157538 A | 8/2011 |
| KR | 20110052528 A | 5/2011 |
| KR | 20110095293 A | 8/2011 |
| KR | 1020110103896 A | 9/2011 |

OTHER PUBLICATIONS

Joncryl ADR-4368 Data Sheet. Jan. 2008.*
Machine translation of KR 10-2011-0103896. Sep. 21, 2011.*
Machine translation of JP 2011-157538. Aug. 18, 2011.*
Biodegradable Mulch Film Made from Bioplastics. Technical Evaluation Report. USDA National Organic Program. Aug. 2, 2012.*
Mansha et al. The effect of plasticization by fatty acid amides on the scratch resistance of PMMA. Wear 271 (2011) 671-679.*
International Search Report for PCT/KR2012/011522 mailed on Apr. 5, 2013.

* cited by examiner

*Primary Examiner* — John Uselding
(74) *Attorney, Agent, or Firm* — Hauptman Ham, LLP

(57) ABSTRACT

The present invention provides a resin composition for flooring characterized in that it comprises a PLA resin, a plasticizer, and an acrylate oligomer. Also, the present invention provides a method for manufacturing flooring, comprising the step of processing flooring which includes a sheet-like molded body of the resin composition and manufacturing the sheet-like molded body by processing the resin composition through extrusion or calendaring methods.

13 Claims, No Drawings

DIMENSIONALLY STABLE RESIN COMPOSITION FOR FLOORING

TECHNICAL FIELD

The present invention relates to a resin composition for flooring materials which includes a PLA resin, a plasticizer, and an acrylate oligomer.

BACKGROUND ART

Recently, with increasing concern for the environment, a construction material using a biodegradable polymer has been actively studied. As a representative material typically used in the art, PVC has a number of advantages in terms of processability, dimensional stability, heat resistance and the like, and is used as a raw material for various products. However, since PVC emits HCl gas in the event of fire, PVC cannot be applied to environmentally friendly products.

As a representative material capable of resolving such problems, polylactic acid (PLA) attracts much interest. PLA is applied to various fields such as medicine, pharmaceuticals, foods, cosmetics, and other industrial purposes (as substitutes for PE and PP), and is also being applied to human implantable polymer materials in recent years. However, a film prepared from a PLA resin exhibits low heat resistance and insufficient dimensional stability, and thus can cause quality problems when applied to flooring materials.

Korean Patent Publication No. 10-2011-0052528A discloses a composition for flooring materials to which melting, extrusion and calendering can be applied. However, this publication does not disclose any separate components other than a PLA resin for a dimensionally stabilizing layer. Therefore, the present invention provides a resin composition prepared through physical crosslinking in order to solve a drawback in terms of dimensional stability of typical PLA films.

Disclosure

Technical Problem

The present invention has been conceived to solve the above problems in the art and is aimed at providing a resin composition, which includes specific components to maintain dimensional stability, a flooring material prepared using the resin composition, and a method for preparing the flooring material.

Technical Solution

It is one aspect of the present invention to provide a resin composition for flooring materials which includes a PLA resin, a plasticizer and an acrylate oligomer.

It is another aspect of the present invention to provide a flooring material including a sheet-shaped molded article, and a method for preparing the flooring material.

Advantageous Effects

The resin composition according to the present invention can be applied to flooring materials and interior materials by securing certain dimensional stability and heat resistance, whereas typical PLA resins can cause various quality problems due to insufficient dimensional stability and low heat resistance thereof.

BEST MODE

The above and other aspects, features and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof. Like components will be denoted by like reference numerals throughout the specification.

Hereinafter, a resin composition for flooring materials according to one embodiment of the present invention will be described in detail.

According to the present invention, the resin composition for flooring materials includes a PLA resin, a plasticizer, and an acrylate oligomer.

The PLA resin is a thermoplastic polyester of lactide or lactic acid. For example, the PLA resin may be prepared by polymerization of lactic acid, which is obtained by fermentation of starch extracted from corn, potatoes, and the like. Since corn, potatoes and the like are renewable plant resources, the PLA resin can effectively solve problems due to depletion of petroleum resources. In addition, the PLA resin emits a much smaller amount of environmentally toxic substances, such as $CO_2$ and the like, during use or disposal than petroleum-based materials, such as polyvinyl chloride (PVC) and the like, and is environmentally friendly in that the PLA resin is easily degradable in a natural environment even when discarded.

Here, the PLA resin can be classified into crystalline PLA (c-PLA) resins and amorphous PLA (a-PLA) resins. Here, since a sheet using a crystalline polylactic acid resin can suffer from bleeding, that is, a phenomenon that a plasticizer flows out of a surface of the sheet, an amorphous PLA resin may be used. When the amorphous PLA resin is used, there is a merit in that a compatibilizer, which must conventionally be added for prevention of bleeding, may be omitted. The PLA resin may be a 100% amorphous PLA resin when the amorphous PLA resin is used, or may be a mixture of crystalline and amorphous PLA resins, as needed.

According to the present invention, the PLA resin may be any PLA resin without limitation. For example, the PLA resin may be polylactic acid obtained by polymerization of a monomer mixture including lactide or lactic acid. Specifically, polylactic acid may be a polymer including at least one selected from the group consisting of L-lactic acid, D-lactic acid, L-lactide, D-lactide, L,D-lactide and D,L-lactide as a polymerization unit. Here, lactic acid or lactide may be prepared by fermentation of starch extracted from corn, potatoes, sweet potatoes, and the like.

According to the present invention, the PLA resin may additionally include a monomer, such as glycol compounds including ethylene glycol, propylene glycol and the like; dicarboxylic acids including terephthalic acid, ethanedioic acid and the like; hydroxycarboxylic acids including glycolic acid, 2-hydroxybenzoic acid and the like; and lactones including caprolactone, propiolactone and the like, as a polymerization unit in conjunction with the aforementioned lactic acid or lactide, as needed. Polylactic acid typically includes a repeat unit represented by Formula 1.

[Formula 1]

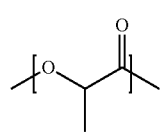

Polylactic acid is environmentally friendly in that polylactic acid scarcely emits greenhouse gases and toxic substances during use or incineration thereof, and is easily biodegradable in a natural environment even when discarded.

The resin composition for flooring materials also includes the plasticizer. The plasticizer can impart excellent flexibility, impact resistance and melt efficiency to the resin composition or a molded article prepared therefrom. According to the present invention, although the plasticizer may be any plasticizer so long as the plasticizer can provide the aforementioned properties, an environmentally friendly plasticizer is preferable. Here, the environmentally friendly plasticizer may be a non-phthalate plasticizer which softens the PLA resin to improve thermoplasticity thereof and thus facilitates molding at high temperature.

Examples of the non-phthalate plasticizer may include triethylcitrate (TEC), acetyl triethylcitrate (ATEC), tripropylcitrate (TPC), acetyl tripropylcitrate (ATPC), tributylcitrate (TBC), acetyl tributylcitrate (ATBC), trihexylcitrate (THC), acetyl trihexylcitrate (ATHC), blends of citrates and modified vegetable oils, and the like. Preferably, the non-phthalate plasticizer is acetyl trihexylcitrate (ATHC), more preferably a mixture of acetyl tributylcitrate and modified vegetable oils.

More specifically, the plasticizer is present in an amount of 20 parts by weight to 80 parts by weight based on 100 parts by weight of the PLA resin. If the amount of the non-phthalate plasticizer is less than 20 parts by weight, the resin composition can suffer from deterioration in processability due to high hardness of the PLA resin, and if the amount of the non-phthalate plasticizer is greater than 80 parts by weight, there is a high possibility that the resin composition can suffer from deterioration in properties due to deterioration in compatibility with other components, and that an excess of the plasticizer can bleed out.

According to the present invention, the acrylate oligomer included in the resin composition may be formed by physical crosslinking. Physical crosslinking is performed by adding a metallic salt to an acrylate monomer, more specifically, by reacting the acrylate monomer with the metallic salt, followed by removing water. The metallic salt may include a monovalent or divalent cation.

The prepared acrylate oligomer includes an ion group therein. Here, the ion group may include at least one selected from the group consisting of zinc, lithium, sodium, aluminum, and potassium ions. In one embodiment, a zinc ion-containing acrylate oligomer may be prepared, as represented by Formula 2.

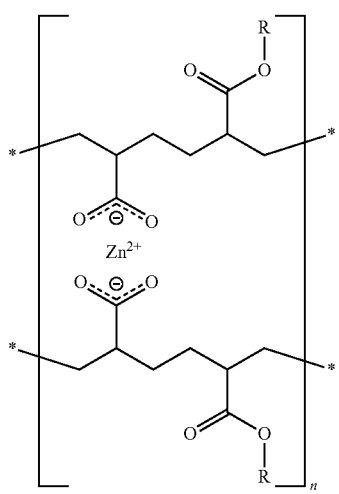

[Formula 2]

More specifically, to prepare a cation group-containing acrylate oligomer, at least one acrylate monomer is added, followed by polymerization, and then a metallic salt is added, followed by reaction. The metallic salt may include a monovalent or divalent cation. Here, the monovalent cation may include metallic ions such as lithium ions, sodium ions and the like, and the divalent cation may include metallic ions such as aluminum ions, potassium ions and the like, without being limited thereto.

The acrylate monomer capable of being used in physical crosslinking may be any acrylate monomer. The acrylate monomer may include at least one selected from among methyl acrylate (MA), methyl metharylate (MMA), ethyl methacrylate (EMA), buthyl methacrylate (BMA), isobornyl methacrylate, and 2-hydroxymethacrylate.

According to the present invention, the acrylate oligomer may be prepared by physical crosslinking. Here, the prepared acrylate oligomer may have a weight average molecular weight from 5,000 to 35,000. If the weight average molecular weight is less than 5,000, there is a concern that bleeding-out of the used plasticizer cannot be controlled, and if the weight average molecular weight is greater than 35,000, there is a problem in that final products suffer from deterioration in mechanical properties and transparency due to problems in dispersion of the acrylate oligomer.

More specifically, physical crosslinking is performed at a reaction temperature from 150° C. to 190° C., preferably from 160° C. to 170° C., thereby preparing the acrylate oligomer according to the present invention. Here, the reaction temperature of physical crosslinking may be adjusted depending upon the molecular weight of the acrylate oligomer desired to be prepared. When the acrylate oligomer has a relatively low molecular weight, the acrylate oligomer can forms a sticky liquid-state oligomer due to a low molecular weight thereof. On the other hand, when the acrylate oligomer has a relatively high molecular weight, the acrylate oligomer can form a flake-state oligomer. Here, the prepared acrylate oligomer preferably has a weight average molecular weight from 5,000 to 10,000.

Further, when the acrylate oligomer having a molecular weight from about 5,000 to 15,000 is prepared, reaction time may range from 30 minutes to 60 minutes, and when the acrylate oligomer having a molecular weight from about 20,000 to 35,000 is prepared, reaction time may range from 80 minutes to 110 minutes. Here, the reaction product may be subjected to vacuum-extraction, followed by removing water, thereby obtaining the acrylate oligomer. Here, time for vacuum-extraction may range from 90 minutes to 130 minutes.

In the acrylate oligomer prepared by physical crosslinking, the ion group is present in an amount of 0.6 parts by weight to 1.0 part by weight, preferably 0.7 parts by weight to 0.9 parts by weight based on 100 parts by weight of the acrylate oligomer. If the amount of the ion group is less than 0.6 parts by weight, the ion group cannot effectively catch the plasticizer due to low ionic bonding strength, and if the amount of the ion group is greater than 1.0 part by weight, the resin composition can suffer from deterioration in properties due to side reaction of the surplus ion group.

The acrylate oligomer may be present in an amount of 10 parts by weight to 80 parts by weight based on 100 parts by weight of the PLA resin. If the amount of the acrylate oligomer is less than 10 parts by weight, there is a concern of deterioration in finished product workability, and if the amount of the acrylate oligomer is greater than 80 parts by weight, there are problems of increase in production costs and deterioration in kneading properties of raw materials.

The resin composition for flooring materials according to the present invention may further include 1 part by weight to 5 parts by weight of a lubricant, 1 part by weight to 5 parts by weight of a nucleating agent, and 1 part by weight to 5 parts by weight of a crosslinking agent, based on 100 parts by weight of the PLA resin.

The resin composition for flooring materials may further include the lubricant to prevent accumulation of deposits or cross-linked products during melt-extrusion and the like.

The lubricant may be any lubricant so long as the lubricant can perform the aforementioned function. For example, the lubricant may include stearic acid and metallic salts (for example, calcium salts, magnesium salts, and zinc salts) thereof; synthetic wax in the form of esters or amides; hydrocarbons such as Montan wax, paraffin wax, and mineral oils; silicone compounds, and the like. More specifically, the lubricant may include zinc stearate, magnesium stearate, calcium stearate, PE wax, PP wax, calcium montanate, magnesium montanate, sodium montanate, and motanic acid.

The lubricant may be present in an amount of 1 part by weight to 5 parts by weight based on 100 parts by weight of the PLA resin. If the amount of the lubricant is less than 1 part by weight, there is a concern of insignificant improvement of moldability, and if the amount of the lubricant is greater than 5 parts by weight, a flooring material can suffer from deterioration in printability due to deterioration in adhesion to an ink, or it is difficult to achieve lamination of the resin composition on another layer due to deterioration in interlayer adhesion.

In addition, the resin composition for flooring materials may further include the crosslinking agent. The crosslinking agent may include photo-crosslinking agents, thermal crosslinking agents, and combinations thereof. For example, the crosslinking agent may include diacrylate crosslinking agents including hexanediol diacrylate, ethylene glycol diacrylate, diethylene glycol diacrylate and triethylene glycol diacrylate, triacrylate crosslinking agents, aziridine crosslinking agents, epoxy crosslinking agents, and the like, without being limited thereto.

The crosslinking agent according to the present invention may include a copolymer of methyl methacrylate (MMA) and glycidyl methacrylate (GMA). This copolymer can improve compatibility of the PLA resin and the acrylate oligomer when used as the crosslinking agent. Here, the crosslinking agent may be present in an amount of 1 part by weight to 5 parts by weight based on 100 parts by weight of the PLA resin. If the amount of the crosslinking agent is less than 1 part by weight, there is a concern of deterioration in mechanical properties of the resin composition, and if the amount of the crosslinking agent is greater than 5 parts by weight, there is a problem in that excessive crosslinking occurs, thereby providing disadvantageous effects on processability and properties of the resin composition.

The resin composition for flooring materials may include the nucleating agent, thereby further improving tensile modulus of the resin composition.

For example, the nucleating agent may include talc, bis(p-methylbenzylidene)sorbitol, sodium 2,2'-methylene-bis(4,6-di-t-butylphenyl)phosphate, metallic salts of rosin, metallic salts of rosin derivatives, metallic salts of benzoic acid, and the like. The metallic salts of rosin, the metallic salts of rosin derivatives, and the metallic salts of benzoic acid may include sodium salts, copper salts, zinc salts, and the like. In addition, the nucleating agent may include metal sorbic acid salts, metal cysteine salts, and 2,4-di-tert-butylphenol metal salts. Here, the metal may include sodium, aluminum, potassium, calcium, and lithium. Here, the nucleating agent may be present in an amount of 1 part by weight to 5 parts by weight based on 100 parts by weight of the PLA resin. If the amount of the nucleating agent is less than 1 part by weight, there is a concern that the nucleating agent does not function effectively, and if the amount of the nucleating agent is greater than 5 parts by weight, there is a problem of agglomeration of the nucleating agent.

Another aspect of the present invention relates to a flooring material including a sheet-shaped molded article of the resin composition according to the present invention. According to the present invention, the flooring material includes at least one sheet-shaped molded article, preferably a calendered article of the resin composition for flooring materials. As used herein, the term "sheet-shaped molded article" refers to a film-shaped or sheet-shaped molded article prepared by applying various methods, such as calendering, extrusion, pressing, and the like, preferably calendering, to the resin composition according to the present invention. According to the present invention, the sheet-shaped molded article includes sheet-shaped or film-shaped foams and non-foams, and may also include molded articles partially or totally subjected to suitable embossing treatment in some cases. As used herein, the term "calendered article" refers to a sheet-shaped molded article prepared by calendering the resin composition according to the present invention.

According to the present invention, the sheet-shaped molded article may be used as at least one layer among layers (for example, a transparent layer, a print layer, an interlayer, a base layer, an elastic foam layer, a back layer, and the like) in an existing polyvinyl chloride (PVC) flooring material, or may be used as all layers constituting the flooring material in some cases.

A further aspect of the present invention relates to a method for preparing a flooring material, which includes preparing a sheet-shaped molded article by calendering the resin composition for flooring materials according to the invention.

According to the present invention, the resin composition for flooring materials may be subjected to various processes known in the art, such as injection molding, extrusion, press molding, calendering, and the like. Preferably, the resin composition is subjected to calendering, as described above. Calendering allows amounts of components such as plasticizers, additives and the like to be freely controlled as compared with other preparation methods. Thus, calendering enables the provision of flooring materials or floor finishing materials, which exhibit excellent properties in terms of flexibility, impact resistance, mechanical strength, processability, stable mounting and melt efficiency, while reducing material costs.

According to the present invention, the sheet-shaped molded article may be prepared by calendering in any manner, without limitation. For example, the sheet-shaped molded article may be prepared through preparing the resin composition by mixing the aforementioned raw materials; kneading the mixed raw materials by heating and pressing the mixed raw materials under appropriate conditions to achieve uniform gelation; and calendering the kneaded mixture into a final sheet shape. For example, mixing and kneading of the raw materials may be performed by mixing and kneading liquid or powder raw materials using a super mixer, an extruder, a kneader, a 2-roll or 3-roll machine, or the like. In addition, for more efficient mixing in the process of mixing and kneading of the raw materials, mixing and kneading may be repeatedly performed in multiple stages, for example, by kneading the raw materials at a predetermined temperature (for example, 120° C. to 200° C.) using a Banbury mixer, followed by primary and secondary mixing of the kneaded raw materials at a predetermined temperature (for example, 120° C. to 200° C.) using a 2-roll machine or the like. Conditions for the raw materials of the resin composition, such as types, mixing ratios and the like, may be appropriately selected within the aforementioned ranges in consideration of purposes for which the sheet-shaped molded article is used (for example, an interlayer, a transparent layer, a foam layer, and the like), without limitation.

The mixed raw materials may be prepared into the sheet-shaped molded article using calendering in any manner without limitation. For example, the mixed raw materials may be prepared into the sheet-shaped molded article using a typical apparatus, such as a reverse L-type 4-roll calender, and the like.

In addition, calendering may be performed under process conditions selected in consideration of constitution of the resin composition, and the like. For example, calendering is performed at a process temperature from 120° C. to 200° C., preferably from 130° C. to 190° C. Upon processing into a sheet, if the process temperature is excessively low, there is a concern of deterioration in moldability of the resin composition due to insufficient softening of the resin, and if the processing temperature is excessively high, there is also a concern of deterioration in moldability of the resin composition due to excessively low viscosity thereof. Thus, the processing temperature may be appropriately controlled in consideration of constitution of the used raw materials, and the like.

According to the present invention, a polylactic acid sheet may be prepared through calendering as described above, followed by additional lamination of at least one polylactic acid sheet or lamination of a polylactic acid sheet and a dimension stabilizing layer (fiber layer or fiber-reinforced resin layer) as needed, thereby preparing a flooring material. According to the present invention, in addition to these processes, the method may further include preparing a decorative layer through any printing method known in the art, such as digital printing, gravure printing, screen printing, offset printing, rotary printing, flexographic printing, and the like; foaming a prepared sheet-shaped molded article under appropriate conditions; forming an embossing pattern on the sheet-shaped molded article; forming a surface treatment layer using UV curable paints, and the like, as needed.

Hereinafter, the present invention will be explained in more detail with reference to some examples. However, it should be understood that these examples are provided for illustration only and are not to be in any way construed as limiting the present invention. A description of details apparent to those skilled in the art will be omitted for clarity.

EXAMPLE

A resin composition for flooring materials including components in amounts as listed in Table 1 was placed in an extruder, followed by reaction and calendering, thereby preparing a thin PLA film.

TABLE 1

| | Constitution | Amount (%) |
|---|---|---|
| PLA resin | PLA resin (2003D, Nature Works Co., Ltd.) | 40 |
| | PLA resin (2060D, Nature Works Co., Ltd.) | 20 |
| Plasticizer | ATBC (Aekyung Petrochemical Co., Ltd.) | 20 |
| Acrylate oligomer | Zinc acrylate oligomer (Formula 2) | 15 |
| Crosslinking agent | Copolymer of MMA & GMA | 5 |
| Lubricant | Motanic acid | 1 |
| Nucleating agent | Calcium cysteine salt | 0.1 |

Zinc oxide (ZnO) was introduced into methyl acrylate (MA), methyl methacrylate (MMA) and ethyl methacrylate (EMA), followed by reaction for 30 minutes. Next, the reaction product was subjected to vacuum extraction, followed by removing water, thereby obtaining an acrylate oligomer having a molecular weight of 7,000, which was used in Example. Here, vacuum-extraction was performed for 100 minutes. Here, the acrylate oligomer includes 0.8 parts by weight of zinc ions based on 100 parts by weight of the acrylate oligomer.

Comparative Example and Reference Example

A PLA film of Comparative Example was prepared in the same manner as in Example except that the acrylate oligomer was not included in a resin composition. That is, the resin composition for flooring materials, which included components as listed in Table 1, was placed in an extruder, followed by reaction and calendering.

Additionally, a PVC film applied to PVC floor sheets was taken as Reference Example and was prepared from PVC (LS100, LG Chemical Co., Ltd.) through calendering by LG HAUSYS Co., Ltd. In preparation of the PVC film of Reference Example, dioctyl phthalate (DOP) was present in an amount of 34 parts by weight to 38 parts by weight based on 100 parts by weight of PVC.

Experimental Example

Dimensional Stability of Flooring Material

Dimensional stability refers to properties allowing formation of a material to be stable and unchanged with respect to change in temperature and humidity. Each of the films prepared in Example and Comparative Example was left in a drying oven at 80° C. for 8 hours, followed by measuring the degree of shrinkage or expansion of the film in accordance with KS M 3802, thereby evaluating dimensional stability. In addition, each of the films of Example and Comparative Example was attached to a dimension-reinforcing layer (PVC Sol-impregnated G/fiber) and left in a drying oven at 80° C. for 8 hours, followed by measuring the degree of shrinkage or expansion of the film again in accordance with KS M 3802.

In addition, each of the films of Example and Comparative Example was attached to a surface of a flooring sheet and left in a drying oven at 80° C. for 8 hours, followed by measuring the degree of bending to evaluate curling of the film. Further, to evaluate heat resistance, each of the films of Example and Comparative Example was brought into contact with a surface of a hot plate, followed by observing whether the shape of the film was maintained. Furthermore, tensile strength and tear strength were measured on each of the films of Example and Comparative Example in accordance with KS M 3507 by measuring load required to stretch and tear the film.

Measurement results of dimensional stability, curling, heat resistance, tensile strength and tear strength are shown in Table 2.

TABLE 2

| Item | Structure | Example | Comparative Example | Reference Example |
|---|---|---|---|---|
| Dimensional stability (%) | Film | −1.5 | −2.8 | −0.6 |
| | Film + Dimension-reinforcing layer | −0.04 | −2.6 | −0.04 |
| Curling (mm) | Film + Dimension-reinforcing layer | 3.8 | 2.5 | 2.4 |
| Heat resistance (° C.) | Film | 155 | 110 | 165 |

TABLE 2-continued

| Item | Structure | Example | Comparative Example | Reference Example |
|---|---|---|---|---|
| Tensile strength (kg/cm²) | Film | 237 | 229 | 254 |
| Tear strength (kg/cm) | Film | 92 | 26 | 120 |

Since a typical PLA film prepared from a resin composition not including an acrylate oligomer exhibited insufficient dimensional stability and low heat resistance and thus can cause various quality problems, it was difficult to apply the typical PLA film as a flooring material. However, according to the present invention, the resin composition for flooring materials, which was prepared by modifying the PLA resin using a zinc acrylate oligomer, was formed into a film for flooring materials, followed by confirming effects of the film.

From comparison results of dimensional stability, which is the most important test item for a flooring material, it could be seen that the PLA film of Example exhibited better dimensional stability than the typical PLA film of Comparative Example, and that, when the dimension-reinforcing layer was additionally applied, the PLA film of Example exhibited significantly improved dimensional stability, whereas the PLA film of Comparative Example did not show significant difference in dimensional stability. In addition, it could be seen that, when the dimension-reinforcing layer was applied to the PLA film of Example, the PLA film exhibited the same level of dimensional stability at that of the PVC film.

From the measurement results of heat resistance, it was confirmed that the PLA film of Example maintained a film shape at 155° C., as compared with the PLA film of Comparative Example, which endured 110° C. at maximum. The PVC film of Reference Example maintained a film shape at 165° C. Thus, it could be seen that the PLA film of Example exhibited excellent heat resistance according to the measurement results of the PLA film similar to those of the PVC film. To apply a film as a surface protective film of a flooring material, the film requires heat resistance at 110° C. to 180° C. Thus, there is no problem in applying the PLA film of Example as the surface protective film of the flooring material due to heat resistance at 155° C., like the PVC film of Reference Example.

As for tensile strength, tear strength and curling, the PLA film of Example showed slightly further improved results than the typical PLA film of Comparative Example. In addition, since the PLA film of Example showed tensile strength, tear strength and curling equivalent to those of the PVC film of Reference Example, there would be no problem in processing/producing the resin composition of Example including the acrylate oligomer into a flooring material.

Therefore, it could be seen that, unlike the PLA film of Comparative Example not including the acrylate oligomer, a PLA flooring material, such as the PLA film of Example, could be formed from the resin composition for flooring materials including the PLA resin, the acrylate oligomer and the plasticizer, and could be sufficiently applied as an environmentally friendly flooring material and an interior material in real life.

The invention claimed is:

1. A resin composition for flooring materials, comprising: a PLA resin; a non-phthalate plasticizer; and an acrylate oligomer containing a metallic ion,
wherein the metallic ion comprises at least one selected from the group consisting of zinc, lithium, aluminum, and potassium ion,
wherein the metallic ion-containing acrylate oligomer has a weight average molecular weight ranging from 5,000 to 10,000,
wherein the acrylate oligomer is present in an amount of 10 parts by weight to 80 parts by weight based on 100 parts by weight of the PLA resin, and
wherein the metallic ion is present in an amount ranging from 0.6 to 1.0 part by weight based on 100 parts by weight of the acrylate oligomer.

2. The resin composition according to claim 1, wherein the PLA resin is a polymer comprising at least one selected from the group consisting of L-lactic acid, D-lactic acid, L-lactide, L,D-lactide, and D,L-lactide as a polymerization unit.

3. The resin composition according to claim 1, wherein the non-phthalate plasticizer is present in an amount of 20 parts by weight to 80 parts by weight based on 100 parts by weight of the PLA resin.

4. The resin composition according to claim 1, wherein the acrylate oligomer is formed by adding a metallic salt to an acrylate monomer.

5. The resin composition according to claim 1, further comprising: 1 part by weight to 5 parts by weight of a lubricant; 1 part by weight to 5 parts by weight of a nucleating agent; and 1 part by weight to 5 parts by weight of a crosslinking agent, based on 100 parts by weight of the PLA resin.

6. A flooring material comprising a sheet-shaped molded article of the resin composition according to claim 1.

7. A method for preparing a florring material, comprising: preparing a sheet-based molded article by processing the resin composition according to claim 1 using extrusion or calendering.

8. The resin composition according to claim 1, wherein PLA resin included a monomer comprising glycol compound, dicarboxylic acid, hydroxycarboxylic acid, and lactone.

9. The resin composition according to claim 1, wherein the non-phthalate plasticizer comprises acetyl trihexylcitrate (ATHC).

10. The resin composition according to claim 1, wherein the non-phthalate plasticizer comprises triethylcitrate (TEC), acetyl triethylcitrate (ATEC), triproylcitrate (TPC), acetyl tripropylcitrate (ATPC), tributylcitrate (TBC), acetyl tributylcitrate (ATBC), trihexylcitrate (THC), blends of citrates and modified vegetable oils.

11. The resin composition according to claim 5, wherein the crosslinking agent comprises a methyl metharylate (MMA) and glycidyl methacrylate (GMA).

12. The method for preparing a flooring material according to claim 7, wherein the calendaring is performed at a temperature ranging from 120° C. to 200° C.

13. A resin composition for flooring materials, comprising: a PLA resin; a non-phthalate plasticizer; and a zinc ion-containing acrylate oligomer,
wherein the zinc ion-containing acrylate oligomer has a weight average molecular weight ranging from 5,000 to 10,000,
wherein the acrylate oligomer is present in an amount of 10 parts by weight to 80 parts by weight based on 100 parts by weight of the PLA resin, and
wherein the zinc ion is present in an amount ranging from 0.6 to 1.0 part by weight based on 100 parts by weight of the acrylate oligomer.

* * * * *